R. R. MURRAY.
CHICKEN BROODER.
APPLICATION FILED AUG. 15, 1918.
1,302,411.
Patented Apr. 29, 1919.
2 SHEETS—SHEET 1.
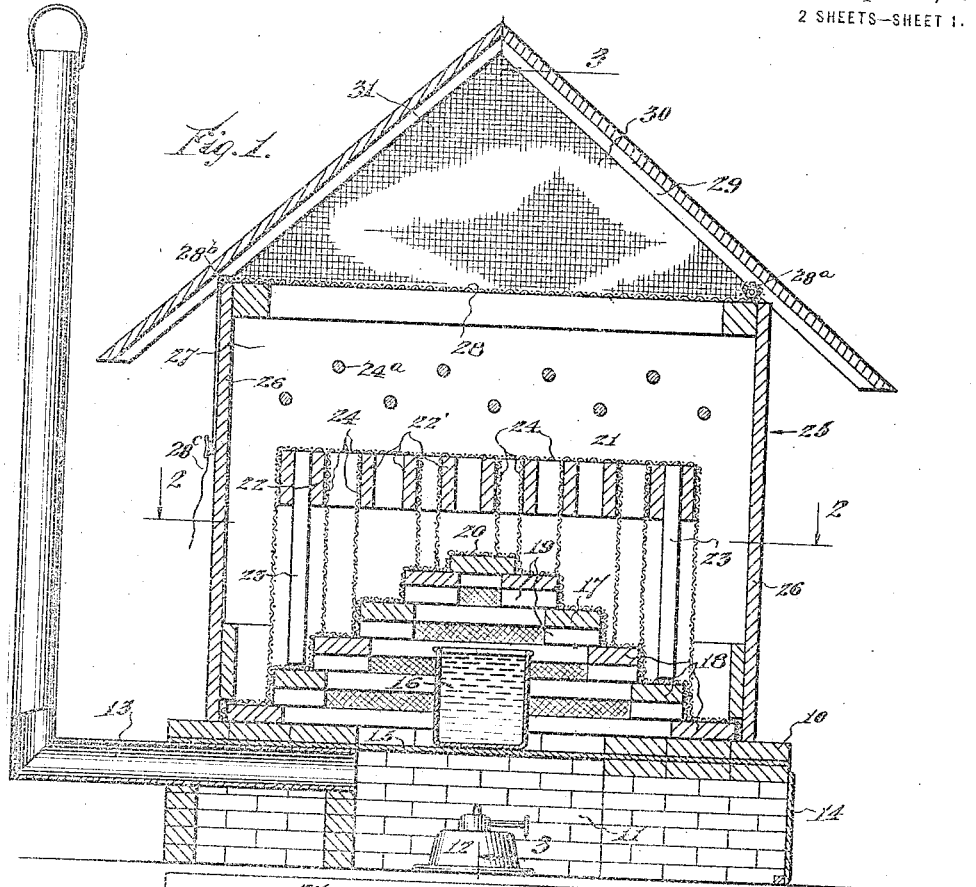
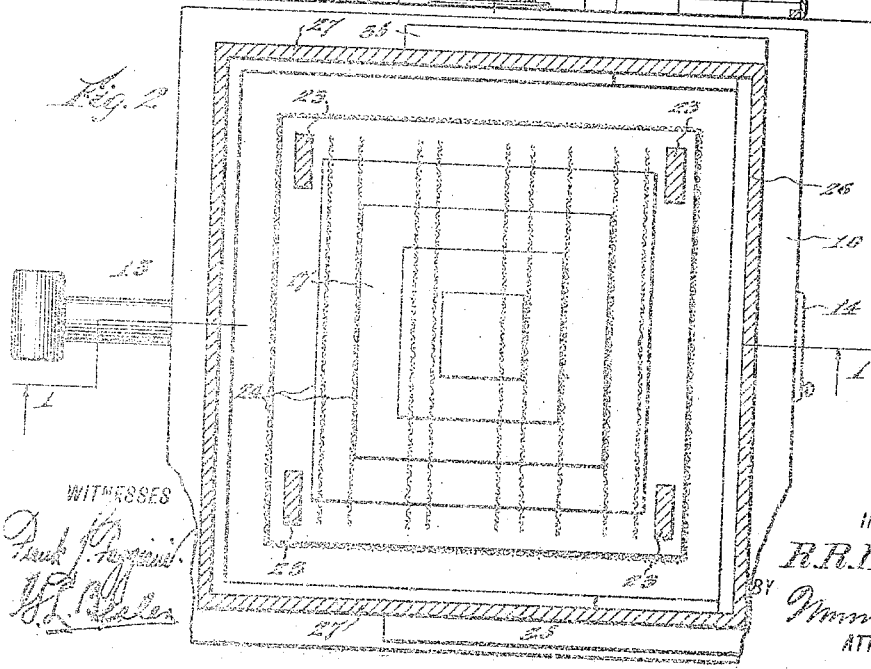
INVENTOR
R. R. Murray,
ATTORNEYS

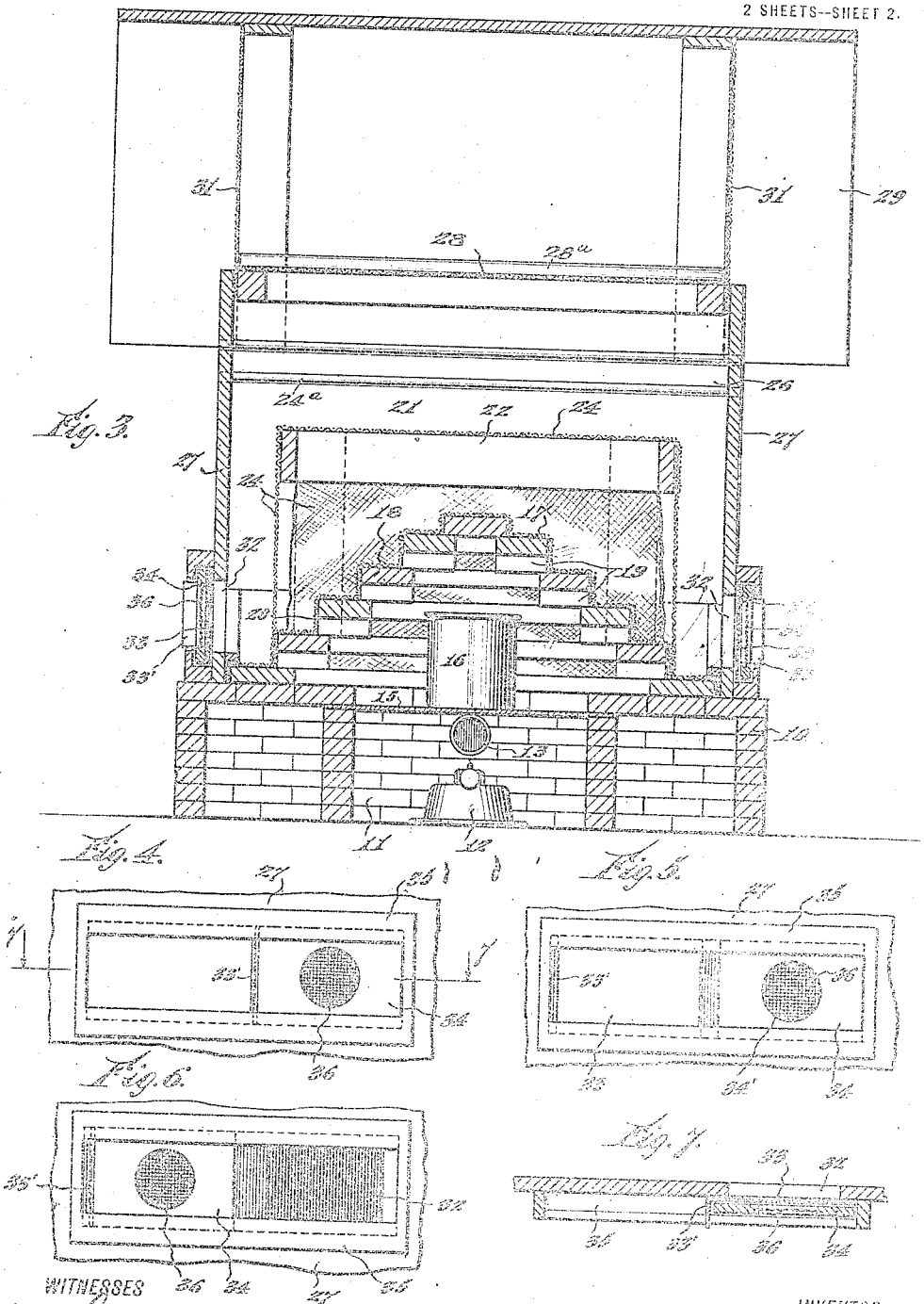

UNITED STATES PATENT OFFICE.

RICHARD R. MURRAY, OF MILFORD, TEXAS.

CHICKEN-BROODER.

1,302,411.

Specification of Letters Patent.

Patented Apr. 29, 1919.

Application filed August 15, 1918. Serial No. 250,042.

*To all whom it may concern:*

Be it known that I, RICHARD R. MURRAY, a citizen of the United States, and a resident of Milford, in the county of Ellis and State of Texas, have invented a new and Improved Chicken-Brooder, of which the following is a full, clear, and exact description.

This invention relates to poultry raising, and has particular reference to the care of young chicks or the like.

Among the objects of the invention is to provide an improved brooder adapted especially for outdoor use or independently of a poultry house.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a vertical transverse section on the line 1—1 of Fig. 2.

Fig. 2 is a horizontal section on the line 2—2 of Fig. 1.

Fig. 3 is a vertical longitudinal section on the line 3—3 of Fig. 1.

Fig. 4 is a side elevation of one of the door structures, both slides being closed.

Fig. 5 is a similar view with the plate slide open.

Fig. 6 is a similar view with both sides drawn, and the doorway wide open; and

Fig. 7 is a sectional view of this same structure on the line 7—7 of Fig. 4.

Referring now more specifically to the drawings, 10 represents the foundation indicated as made of brick, artificial stone, or other suitable durable and fireproof material adapted to be made of any suitable size or proportions, and erected in a permanent manner. This portion of the structure constitutes not only a foundation for the other parts to be described, but also as a furnace room or heat generating space 11 as indicated in Figs. 1 and 3. 12 indicates any suitable type of heater arranged within the space 11 and from which the products of combustion are conveyed outward and upward through a flue 13. Access to the heater may be hand through a door 14 arranged at the front of the foundation. Above the heater 12 I provide a sheet metal deck or plate 15 which serves to protect the superposed structure from the effect of the direct heat and constitutes also a support for a receptacle 16 to be kept supplied with water.

Supported directly upon the foundation is a pyramidal structure 17 which from its form will be referred to hereinafter as the pyramid. The pyramid is built up of a series of tiers or rectangular frames 18 each of which is smaller than the one below it and is spaced therefrom by means of corner blocks 19 and the entire pyramid is then covered with some suitable open mesh material 20 such as burlap, or its equivalent, whereby the moist warm air from the hollow interior of the pyramid is adapted to circulate or pass freely outward and upward between the adjacent frames 18. The steps afforded by these superposed frames covered with burlap afford natural resting or perching places for the young birds whose feet will thereby come directly opposite the open spaces between the frames, and will hence be kept warm from the heat emanating from the interior of the pyramid.

The hover 21 comprises a rectangular frame 22 having four corner legs or standards 23 that are adapted to rest down directly upon one of the lowermost frame members 18. The frame 22 is made up of parallel slats 22' over and between which extend and depend slitted fabric strips 24, the ends of which reach to or close to the burlap 20 covering the pyramid. The chicks in a well known manner assemble beneath the hover where they are protected from dangerous cool drafts of air. The hover is suitably supported so as to be readily removed for cleansing or sterilizing of the apparatus from time to time, and yet its means for support takes up a very slight amount of floor space on the pyramid.

The main outside shelter may be termed a hut 25 having vertical rectangular side and end walls 26 and 27 respectively, which except for the doorways may be substantially imperforate. The ceiling, however, is of open mesh material 28 such as burlap which insures ample fresh air for the chicks but will prevent dangerous effects of cool blasts of wind from the outside. This ceiling is preferably in the form of a curtain and is mounted on a roller 28ᵃ somewhat in form of a spring curtain roller and provided with a rod 28ᵇ at the free end. This curtain is fastened in position by means of a curtain cord 28ᶜ to the wall 27 of the hut. In the space between the ceiling 28 and the top of the hover 21 are located perches 24ᵃ. Any suitable roof 29 may be supported upon the body of the hut, the roof being shown in the form of a gable, the triangular end spaces 30 between the roof and the deck 28 being preferably covered with wire netting 31 so as to make this part of the structure proof against rats or other predatory vermin. As indicated in the drawings of the second sheet each end wall 27 of the hut is provided with an opening or doorway 32 giving access for the chickens into and out of the interior of the hut, especially for daylight and dry weather service. Each of the doorways, however, is guarded by two slides 33 and 34 movable independently of each other or together along a horizontal guideway 35 fixed to the outside of the wall. The slide 33 is preferably in the form of a metal plate having a hand or finger piece 33' for manipulation. When this slide is closed the opening 32 will be closed substantially tight. The other slide 34 is in the nature of a block of wood pivoted with an opening 34' covered with wire mesh or the like 36 so as to afford additional ventilation and light but which is rat proof. Obviously either of the slides will prevent the passage of the chickens from the opening 32 and when the openings 32 are to be made effective all of the slides are moved to the left as shown in Fig. 6. Any suitable bridges or approaches, not shown, may be provided to lead up to the doorways depending upon the elevation of the same above the ground level.

I claim:

1. The herein described brooder for outdoor use comprising a fireproof base, a source of heat within the base, a flue leading from the heat chamber, said base including a metal plate extending from the flue to the entrance of the heat chamber, a receptacle for water supported upon said plate over the heat chamber, a perching pyramid supported upon the base and surrounding the receptacle, said pyramid comprising spaced frames covered with an open mesh material, a hover supported upon the pyramid and having slitted fabric depending toward the pyramid, and a ventilated vermin proof hut surrounding the hover and pyramid.

2. In a brooder, a hollow pyramidal chick support comprising a series of rectangular frames each of which is spaced upwardly from and is smaller than the next lower frame thus forming a succession of steps, and a covering of open mesh material over all of the steps and spaces.

3. In a brooder, the herein described hover comprising a rectangular frame composed of parallel slats arranged in close parallel vertical planes, a plurality of legs to support the frame, and strips of slitted fabric material extending over and between the slats and depending below the frame, each slitted strip extending over the top of two adjacent slats.

RICHARD R. MURRAY.